US011010248B2

(12) United States Patent
Peterson et al.

(10) Patent No.: US 11,010,248 B2
(45) Date of Patent: *May 18, 2021

(54) REUSE OF RESOURCES IN A STORAGE CONTROLLER FOR EXECUTING WRITE COMMANDS OVER A PLURALITY OF INTERFACES

(71) Applicant: International Business Machines Corporation, Armonk, NY (US)

(72) Inventors: Beth A. Peterson, Tucson, AZ (US); Kevin J. Ash, Tucson, AZ (US); Lokesh M. Gupta, Tucson, AZ (US); Chung M. Fung, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 128 days.

This patent is subject to a terminal disclaimer.

(21) Appl. No.: 16/289,456

(22) Filed: Feb. 28, 2019

(65) Prior Publication Data
US 2020/0278909 A1 Sep. 3, 2020

(51) Int. Cl.
G06F 11/14 (2006.01)
G06F 3/06 (2006.01)

(52) U.S. Cl.
CPC .......... G06F 11/141 (2013.01); G06F 3/0619 (2013.01); G06F 3/0659 (2013.01); G06F 3/0679 (2013.01)

(58) Field of Classification Search
CPC combination set(s) only.
See application file for complete search history.

(56) References Cited

U.S. PATENT DOCUMENTS 5,590,290 A * 12/1996 Kondo ................. G06F 13/364
710/105
6,181,704 B1 * 1/2001 Drottar ................. H04L 1/0057
370/231

(Continued)

OTHER PUBLICATIONS

Baker M. et al., "Non-Volatile Memory for Fast, Reliable File Systems", Proceedings of the Fifth International Conference on Architectural Support for Programming Languages and Operating Systems, Oct. 1992, Total 13 pp.

(Continued)

*Primary Examiner* — Amine Riad
(74) *Attorney, Agent, or Firm* — Konrad Raynes Davda & Victor LLP; Rabindranath Dutta

(57) ABSTRACT

Provided are a method, system, and computer program product in which a storage controller receives a first write command with a first token over a first interface from a host computational device. In response to a failure of the first write command in the storage controller, the storage controller retains selected resources for reuse for a retry of the first write command, wherein the retry of the first write command is expected from the host computational device over a second interface that is a slower communication link than the first interface. In response to receiving, by the storage controller, a second write command with a second token over the second interface, wherein the second token is identical to the first token, the storage controller determines that the second write command is a retry of the first write command and reuses the retained selected resources for executing the second write command.

20 Claims, 12 Drawing Sheets

(56) References Cited

U.S. PATENT DOCUMENTS

| | | | | |
|---|---|---|---|---|
| 6,219,735 | B1 * | 4/2001 | Kondo | G06F 13/364 |
| | | | | 710/107 |
| 6,543,014 | B1 * | 4/2003 | Okuyama | H04L 45/20 |
| | | | | 370/412 |
| 6,633,936 | B1 * | 10/2003 | Keller | G06F 13/161 |
| | | | | 710/107 |
| 7,715,378 | B1 * | 5/2010 | Daigle | H04L 43/0817 |
| | | | | 370/386 |
| 8,176,357 | B2 * | 5/2012 | Hsu | G06F 11/0727 |
| | | | | 714/4.1 |
| 8,694,714 | B2 * | 4/2014 | Kern | G06F 12/0246 |
| | | | | 711/103 |
| 8,762,775 | B2 * | 6/2014 | Hsu | G06F 16/51 |
| | | | | 714/18 |
| 8,780,474 | B2 | 7/2014 | Hirata et al. | |
| 9,274,892 | B2 * | 3/2016 | Tsern | G06F 11/006 |
| 9,356,737 | B2 * | 5/2016 | Wood | H04L 1/08 |
| 9,715,352 | B2 | 7/2017 | Craddock et al. | |
| 9,871,624 | B2 * | 1/2018 | Shiraishi | G06F 11/0709 |
| 9,971,545 | B1 | 5/2018 | Asnaashari | |
| 2003/0191831 | A1 * | 10/2003 | Hu | H04L 69/40 |
| | | | | 709/223 |
| 2004/0078638 | A1 * | 4/2004 | Cochran | G06F 11/2087 |
| | | | | 714/6.12 |
| 2004/0202446 | A1 * | 10/2004 | Namkoong | G11B 20/18 |
| | | | | 386/263 |
| 2008/0059738 | A1 * | 3/2008 | Burr | G06F 11/2074 |
| | | | | 711/162 |
| 2012/0072638 | A1 * | 3/2012 | Grubb | G06F 9/45558 |
| | | | | 711/6 |
| 2013/0346700 | A1 * | 12/2013 | Tomlinson | G06F 9/526 |
| | | | | 711/133 |
| 2019/0034302 | A1 * | 1/2019 | Anderson | G06F 12/0813 |
| 2019/0034304 | A1 * | 1/2019 | Anderson | G06F 11/2092 |
| 2019/0042096 | A1 * | 2/2019 | Anderson | G06F 3/0617 |
| 2019/0042115 | A1 | 2/2019 | Anderson et al. | |
| 2019/0050340 | A1 * | 2/2019 | Anderson | G06F 3/0689 |
| 2020/0034039 | A1 * | 1/2020 | Jiang | G06F 11/00 |

OTHER PUBLICATIONS

Dufrasne, B., "IBM DS8880 Architecture and Implementation", Release 8.5, IBM Red Book, Nov. 19, 2018, 514 pp.

ip.com, "Apparatus and Device for Host Read all the Time", Nov. 3, 2013, IP.com No. IPCOM000232353D, retrieved from the Internet at <URL: https://ip.com/IPCOM/000232353>, Total 4 pp.

ip.com, "Collaboration between Filesystem and Storage Controllers to Improve Performance and Simplify Deployment via Enforced Data Striping", Jan. 30, 2013, IP.com No. IPCOM000225208D, retrieved from the Internet at <URL: https://ip.com/IPCOM/000225208>, Total 6 pp.

ip.com, "Method for Enhanced Application Performance During Storage Migrations in Multi-tier Storage Environment", Jul. 17, 2018, IP.com No. IPCOM000254599D, retrieved from the Internet at <URL: https://ip.com/IPCOM/000254599>, Total 5 pp.

Junior, J.G.B., et al., "Getting Started with IBM zHyperLink for z/OS", IBM Red Paper, Jun. 2018, 118 pp.

Kandemir, M. et al., "Improving I/O Performance of Applications through Compiler-Directed Code Restructuring", 2008, FAST '08: 6th USENIX Conference on File and Storage Technologies, USENIX Association, Total 16 pp.

Watkins N. et al., "Automatic and Transparent I/O Optimization With Storage Integrated Application Runtime Support", 2015, Copyright 2015 Association for Computing Machinery, PDSW 2015 Nov. 15-20, 2015 Austin, TX, USA, Copyright 2015 ACM, Total 6 pp.

List of IBM Patents or Patent Applications Treated as Related, Feb. 28, 2019, 2 pp. [18.851 (Appendix P)].

U.S. Appl. No. 16/289,461, entitled "Token Management for Write Commands Transmitted by a Host Over a Plurality of Interfaces to a Storage Controller", invented by B.A. Peterson et al., filed Feb. 28, 2019, 38 pp. [18.861 (Appln)].

U.S. Appl. No. 15/696,037, entitled "Using Real Segments and Alternate Segments in Non-Volatile Storage", invented by K.A. Anderson, et al., filed Sep. 5, 2017, 44 pp. [18.739 (Appln)].

Notice of Allowance 1 for U.S. Appl. No. 16/289,461, dated Jun. 15, 2020, 12 pp. [18.861 (NOA)].

* cited by examiner

REUSE OF RESOURCES IN A STORAGE CONTROLLER FOR EXECUTING WRITE COMMANDS OVER A PLURALITY OF INTERFACES

BACKGROUND

1. Field

Embodiments relate to the reuse of resources in a storage controller for executing write commands over a plurality of interfaces.

2. Background

A storage system may control access to storage for one or more host computational devices that may be coupled to the storage system over a network. A storage management application that executes in the storage system may manage a plurality of storage devices, such as disk drives, tape drives, flash drives, direct access storage devices (DASD), etc., that are coupled to the storage system. A host may send Input/Output (I/O) commands to the storage system and the storage system may execute the I/O commands to read data from the storage devices or write data to the storage devices. The storage system may also be referred to as a storage controller.

The storage system may include two or more servers, where each server may be referred to as a node, a storage server, a processor complex, a Central Processor Complex (CPC), or a Central Electronics Complex (CEC). Each server may be included in a cluster. Each server may have a plurality of processor cores and the servers may share the workload of the storage system. In a two server configuration of the storage system referred to as a dual-server storage controller, either server can failover to the other if there is a failure or a planned downtime for one of the two servers.

The storage system attempts to maintain two copies of the data while data is moving through the storage system. The servers have two areas of their primary memory that are used for holding host data: cache and non-volatile storage (NVS). NVS contains write data until the data is destaged from the cache to the storage drives. When a write is sent to a volume and both the servers are operational, the write data is placed into the cache of the owning server and into the NVS of the other server, where the owning server may be referred to as a cache node or CA node and the other server may be referred to as a NA node. The NVS copy of the write data may be accessed if a write failure occurs and the cache is empty or possibly invalid in the owning server. Otherwise, the NVS copy of the write data is discarded after destage operations from cache to the storage drives are complete.

When an input/output (I/O) request is performed by an application, several processes are performed to complete the I/O request and this affects the I/O latency. The I/O latency may be a significant part of application response time. ZHYPERLINK* (also referred to as zHyperLink) is a mechanism that is used to reduce the I/O latency by providing a fast, reliable, and direct communication path between a host and a storage controller. This goal is accomplished by installing zHyperLink adapters on the host and storage controller, and connecting the zHyperLink adapters by zHyperLink cables. This configuration creates point-to-point connection between the host computational device and the storage controller and reduces the I/O response time in comparison to other mechanisms such as those over a network interface. Such low response time is achieved by using synchronous I/O (syncio) requests, which reduces the time that is required for some functions, such as for I/O interrupts and dispatch times.

Standard I/O processing requires I/O operations to perform a series of time-consuming tasks that includes dispatching, interrupt handling, Central Processing Unit (CPU) queue time, CPU cache reload activities, etc. These tasks and other tasks that are required for I/O processing cause the I/O response time to be relatively long compared to transferring data within virtual storage. When a syncio is performed, the CPU waits or "spins" until the I/O is completed, or the timeout value is reached. zHyperLink that uses syncio may significantly reduce the time that is required to complete the I/O because the dispatching, interrupt handling, CPU queue time, and CPU cache reload activities are no longer necessary. Further details of zHyperLink may be found in the publication "Getting Started with IBM zHyperLink for z/OS" published June 2018, by International Business Machines Corporation. Additional details of zHyperLink in the context of a storage controller may be found in the publication "IBM DS8880 Architecture and Implementation (Release 8.5)" published August 2018 by International Business Machines Corporation.

SUMMARY OF THE PREFERRED EMBODIMENTS

Provided are a method, system, and computer program product in which a storage controller receives a first write command with a first token over a first interface from a host computational device. In response to a failure of the first write command in the storage controller, the storage controller retains selected resources for reuse for a retry of the first write command, wherein the retry of the first write command is expected from the host computational device over a second interface that is a slower communication link than the first interface. In response to receiving, by the storage controller, a second write command with a second token over the second interface, wherein the second token is identical to the first token, the storage controller determines that the second write command is a retry of the first write command and reuses the retained selected resources for executing the second write command.

In further embodiments, in response to determining, by the storage controller, that the second token received with the second write command is identical to the first token received with the first write command, the storage controller determines that the selected resources retained in response to the failure of the first write command are to be reused for executing the second write command.

In additional embodiments, the first interface is a bus interface, and the second interface is a network interface.

In certain embodiments, the first write command is executed over the bus interface via a syncio process, wherein in the syncio process, the host computational device holds an application thread in a spin loop waiting for the first write command to complete.

In further embodiments, the second write command is executed over the network interface via a non-syncio process, wherein in the non-syncio process, the host computational device does not hold an application thread in a spin loop waiting for the second write command to complete.

In additional embodiments, the bus interface is a Peripheral Component Interconnect (PCI) interface, wherein PCI window resources acquired for executing the first write command are released in response to the failure of the first write command.

In yet additional embodiments, retained resources include at least cache segments and non-volatile storage (NVS) segments.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Syncio (also referred to as sync I/O or synchronous I/O) comprises an attachment hardware and protocol for computational devices. Syncio is designed for very low latency random reads and small block sequential writes. Syncio connections between computational devices may be over point to point optical Peripheral Component Interconnect Express (PCIe) interfaces. Syncio operations behave differently than traditional I/O in that in syncio a host computational device may hold an application thread in a spin loop while waiting for the I/O operation to complete. This avoids the need for processor cycles to perform the two context swaps of traditional I/O, the need to perform operations for putting the I/O thread to sleep and then re-dispatching the I/O thread, and the need for an I/O interrupt. Syncio operations may be performed by a syncio process and may correspond to a high speed data transfer process from a host to a storage controller. Syncio writes may be referred to as zHyperLink (ZHL) writes.

The code path needs to be extremely optimized to meet the completion time requirements of syncio. Any condition that delays the completion of the syncio operation, such as a cache miss, may cause an indication of an "unable to perform syncio status" to be sent from the storage controller to the host, and the operation has to be retried via traditional I/O (also referred to as non-syncio) on a network interface link. Traditional I/O is much more time consuming than syncio.

In certain embodiments, a syncio operation is successfully completed when microcode is able to complete the syncio operation within a very low duration of time (e.g., 10-30 microseconds). If the syncio takes longer than that, then the syncio operations fails, and the host computational device retries the operation via traditional I/O on a non-optimal path such as a network interface [e.g. Fibre connection (FICON)]. Resources like track access resources, cache segments, non-volatile storage (NVS) segments, etc., are resources that have been used for the syncio operation. When the syncio operation fails these resources are released. I/O operation through the network interface acquires these resources again to complete the operation and this is time consuming.

In certain embodiments, such resources are seamlessly transferred from the bus interface link of syncio to the network interface link of traditional I/O, so that traditional I/O does not spend time and resources to acquire these resources once again, and this results in an improvement in the functioning of a computational device.

Exemplary Embodiments

Figure 1:
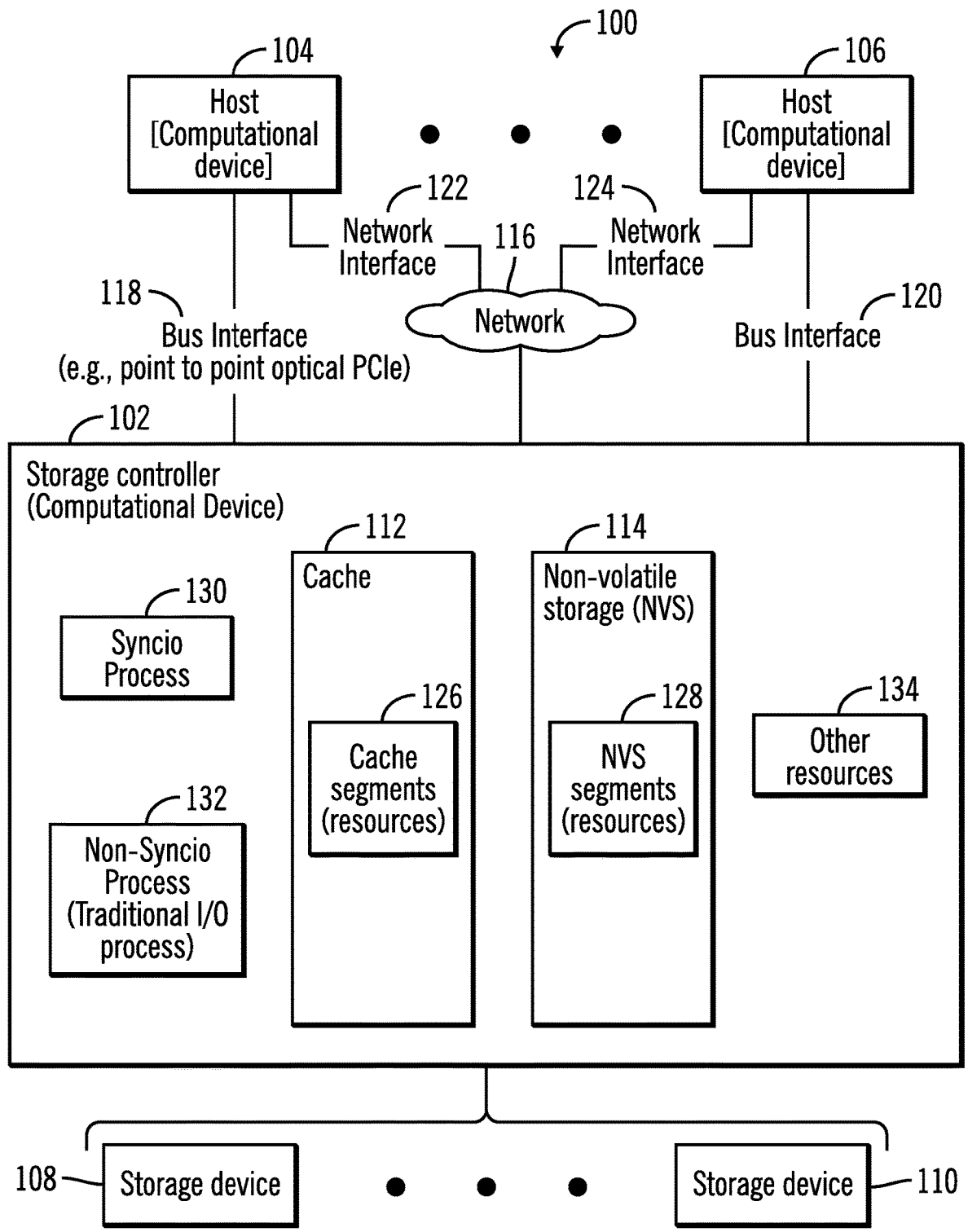
FIG. 1 illustrates a block diagram of a computing environment comprising a storage controller coupled to one or more hosts and one or more storage devices in which non-syncio processing is used for performing write operations when syncio processing of write operations fails, in accordance with certain embodiments.

FIG. 1 illustrates a block diagram of a computing environment 100 comprising a storage controller 102 coupled to one or more hosts 104, 106, and one or more storage devices 108, 110, in accordance with certain embodiments. The storage controller 102 allows the plurality of hosts 104, 106 to perform input/output (I/O) operations with logical storage maintained by the storage controller 102. The physical storage corresponding to the logical storage may be found in at least one or more of the storage devices 108, 110 and/or a cache 112 and NVS 114 of the storage controller 102.

The storage controller 102 and the hosts 104, 106 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102, the hosts 104, 106, and the storage devices 108, 110 may be elements in any suitable network 116, such as, a storage area network, a wide area network, the Internet, an intranet. In certain embodiments, the storage controller 102, the hosts 104, 106, and the storage devices 108, 110 may be elements in a cloud computing environment that comprises the computing environment 100. The storage devices 108, 110 may be comprised of storage disks, tape drives, solid state storage, etc., and may be controlled by the storage controller 102.

In certain embodiments, the hosts 104, 106 may be coupled to the storage controller 102 via a bus interface (e.g., a point to point optical PCIe interface) 118, 120 and a network interface 122, 124. Syncio operations from the hosts 104, 106 may be performed over the bus interfaces 118, 120. Traditional I/O operations from the hosts 104, 106 may be performed over the network interfaces 122, 124. The bus interfaces 118, 120 may comprise a faster access channel for I/O than the network interfaces 122, 124. Additional bus interface technology to extend the bus interface 118, 120 may be utilized, including PCIe extender cables or components, such as a distributed PCIe switch, to allow PCIe over Ethernet, such as with the ExpEther technology.

The cache 112 may store tracks in cache segments 126, and the NVS 114 may also store tracks in NVS segments 128.

The storage controller 102 executes a syncio process 130 and a non-syncio process 132 (i.e., a traditional I/O process). The syncio process 130 and the non-syncio process 132 may use resources, such as one or more of the cache segments 126, one or more of the NVS segments 128 and other resources 134 while performing I/O operations.

Figure 2:
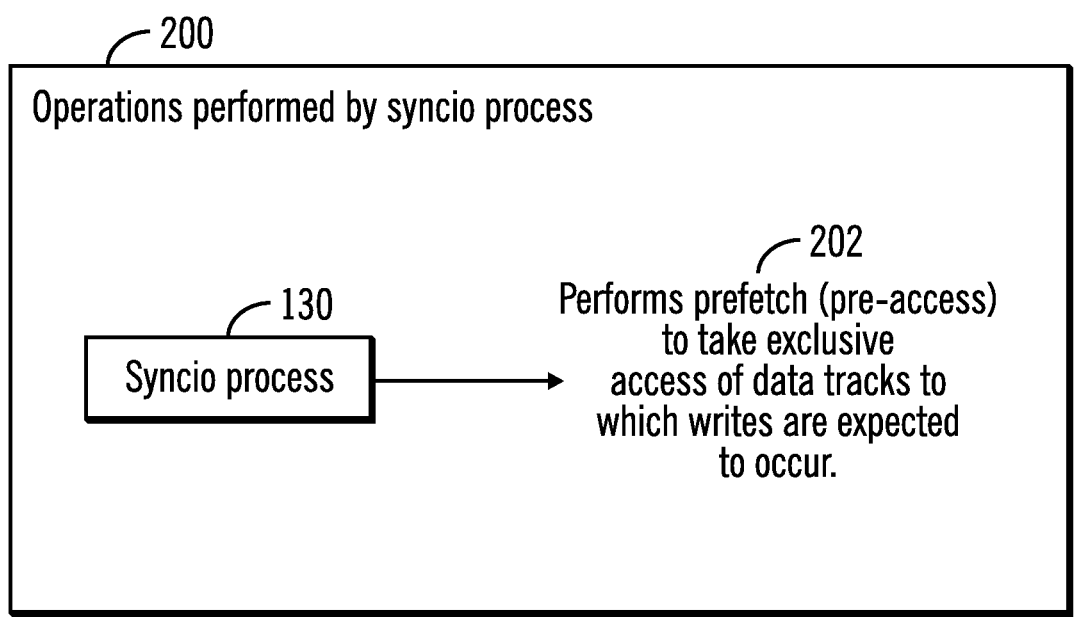
FIG. 2 illustrates a block diagram that shows operations performed by a syncio process, in accordance with certain embodiments.

FIG. 2 illustrates a block diagram 200 that shows operations performed by a syncio process 130, in accordance with certain embodiments.

The syncio process 130 performs a prefetch (i.e. pre-access) to secure exclusive access of tracks to which writes are expected to occur (shown via reference numeral 202). Thus the storage controller 102 takes pre-access on the track for syncio writes. This is performed prior to a write coming via syncio over the bus interfaces 118, 120. As part of pre-access, all resources (e.g., NVS segments 128, cache segments 126, NVS track buffers) are allocated. Once the write comes into the storage controller 102, track access is already taken and the write can immediately proceed with performing direct memory access (DMA) to both cache 112 and NVS 114 and then marking the modified bitmaps associated with the write. If the write fails to complete for any reason, then the syncio write is failed by the storage controller 102 and an indication of the failure is transmitted to the host computational device that sent the syncio write.

Figure 3:
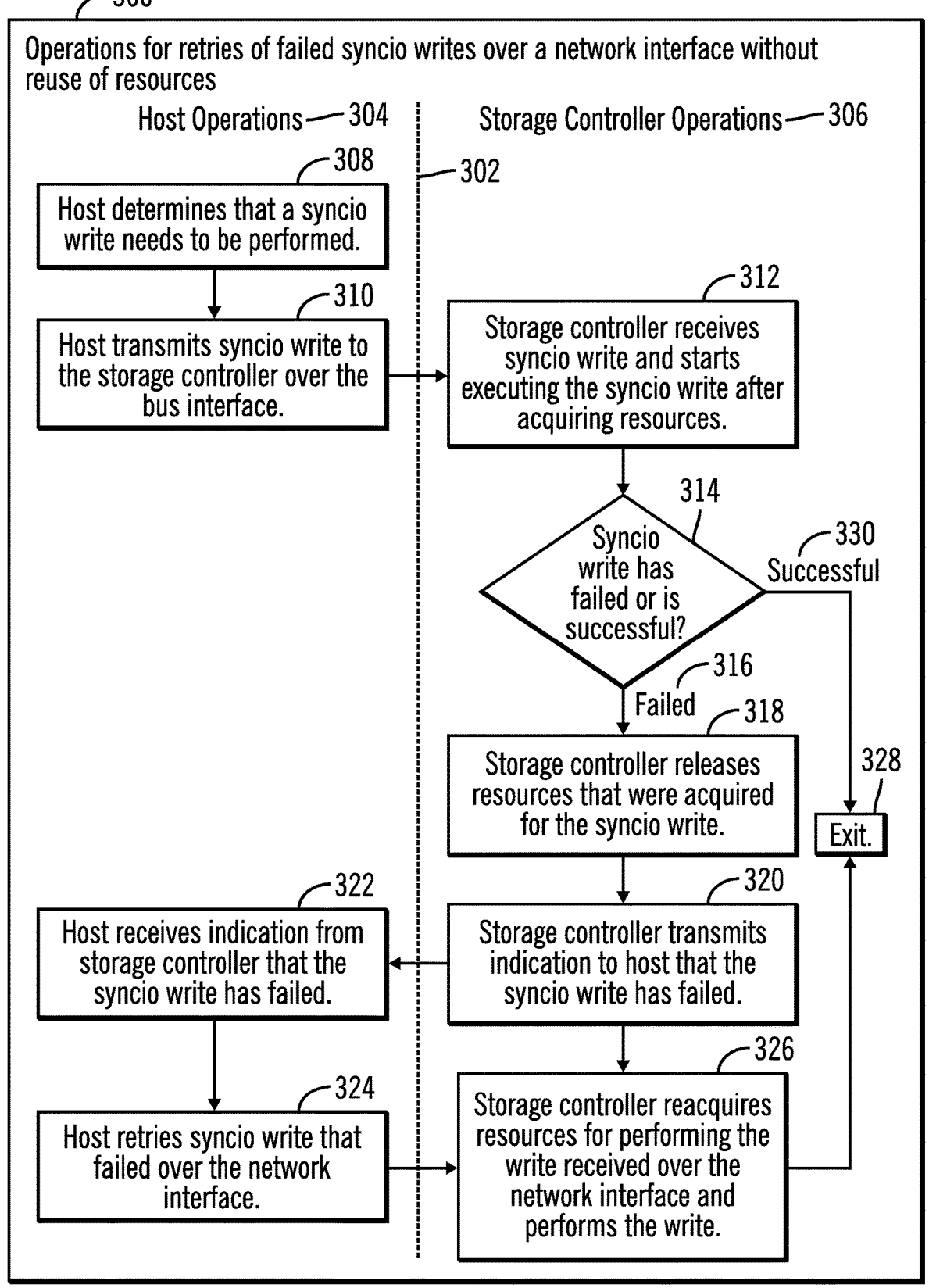
FIG. 3 illustrates a flowchart that shows operations for retries of failed syncio writes over a network interface without reuse of resources, in accordance with certain embodiments.

FIG. 3 illustrates a flowchart 300 that shows operations for retries of failed syncio writes over a network interface 122, 124 without reuse of resources, in accordance with certain embodiments. The operations shown to the left of the vertical dashed line 302 are operations performed by the host computational device 104 (referred to as host operations 304). The operations shown to the right of the vertical dashed line 302 are operations performed by the storage controller 102 (referred to as storage controller operations 306).

Control starts at block 308 in which a host 104 determines that a syncio write needs to be performed, and then the host 104 transmits (at block 310) the syncio write to the storage controller 102 over the bus interface 118.

The storage controller 102 receives (at block 312) the syncio write and starts executing the syncio write after acquiring resources to perform the syncio write, and then determines (at block 314) whether the syncio write has failed or is successful. If the syncio write has failed (branch 316) then control proceeds to block 318 in which the storage controller 102 releases the resources that were acquired for the syncio write. The storage controller 102 then transmits (at block 320) an indication to the host 104 that the syncio write has failed.

The host 104 receives (at block 322) the indication from the storage controller 102 that the syncio write has failed, and then the host 104 retries (at block 324) the syncio write that failed by sending the write over the network interface 122 to the storage controller 102.

Since in this embodiment, the storage controller 102 has already released the resources that were acquired for the syncio write, the storage controller reacquires (at block 326) at least some of the resources for performing the write received over the network interface 122 and then performs the write. Then the process exits (at block 328). Also, at block 314 if the syncio write is successful (branch 330), then the process exits (at block 328).

The operations performed in block 326 in which certain resources previously acquired for syncio have to be reacquired is time consuming. However, since syncio writes in FIG. 3 are not identified by a unique identification, there is no way for the storage controller 102 to retain resources for reuse for the non-syncio write received from the host 104 (via host operations performed at block 324).

Figure 4:
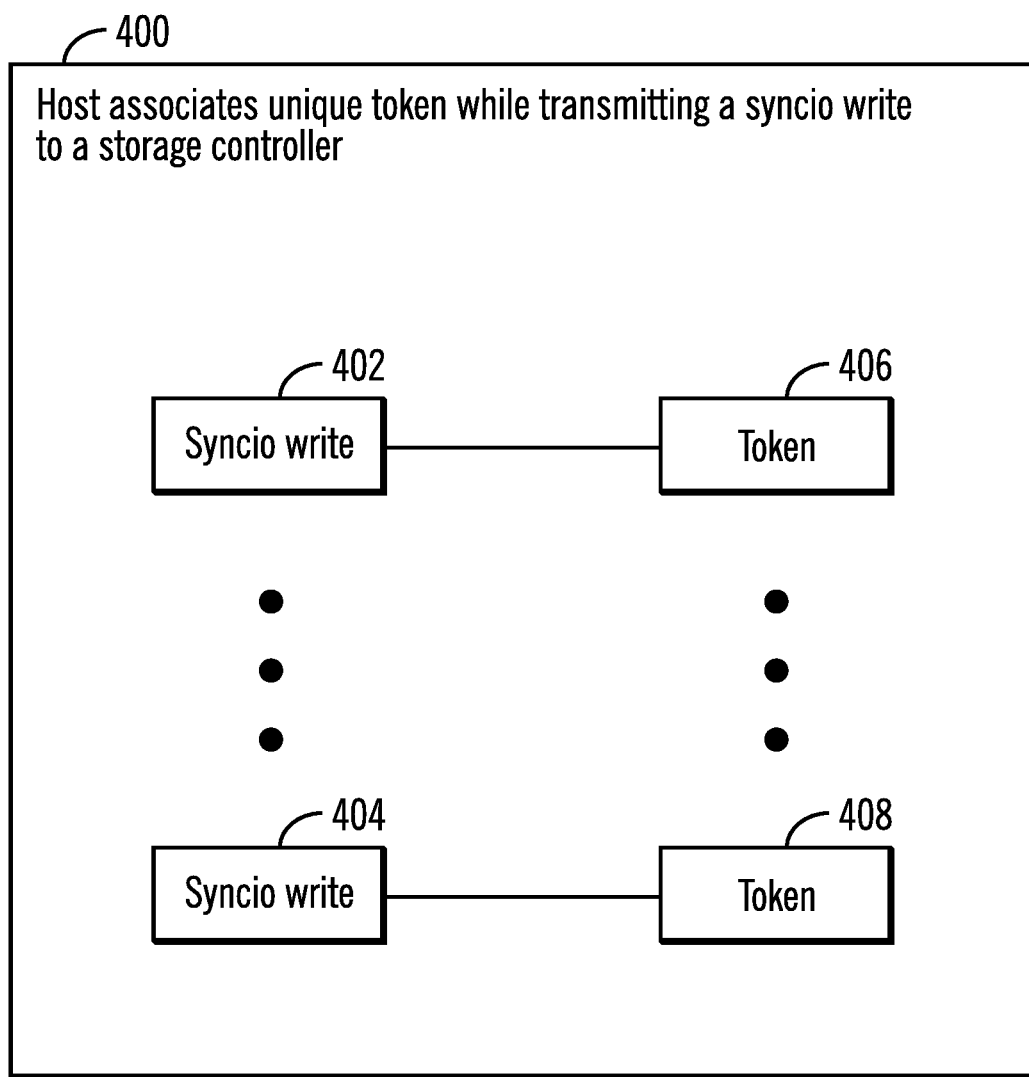
FIG. 4 illustrates a block diagram that shows how a host associates a unique token while transmitting a syncio write to a storage controller, in accordance with certain embodiments.

FIG. 4 illustrates a block diagram 400 that shows how a host 104 associates a unique token while transmitting a syncio write to a storage controller 102, in accordance with certain embodiments.

A plurality of syncio writes 402, 404 and the corresponding tokens 406, 408 are shown in FIG. 4. Each token uniquely identifies a syncio write. For example, token 406 is a unique identification for the syncio write 402, and token 408 is a unique identification for the syncio write 404. The unique identification may be a numeric in certain embodiments. For example, in certain embodiments each token may be a 64 bit number, and different numbers are associated with different syncio writes.

Figure 5:
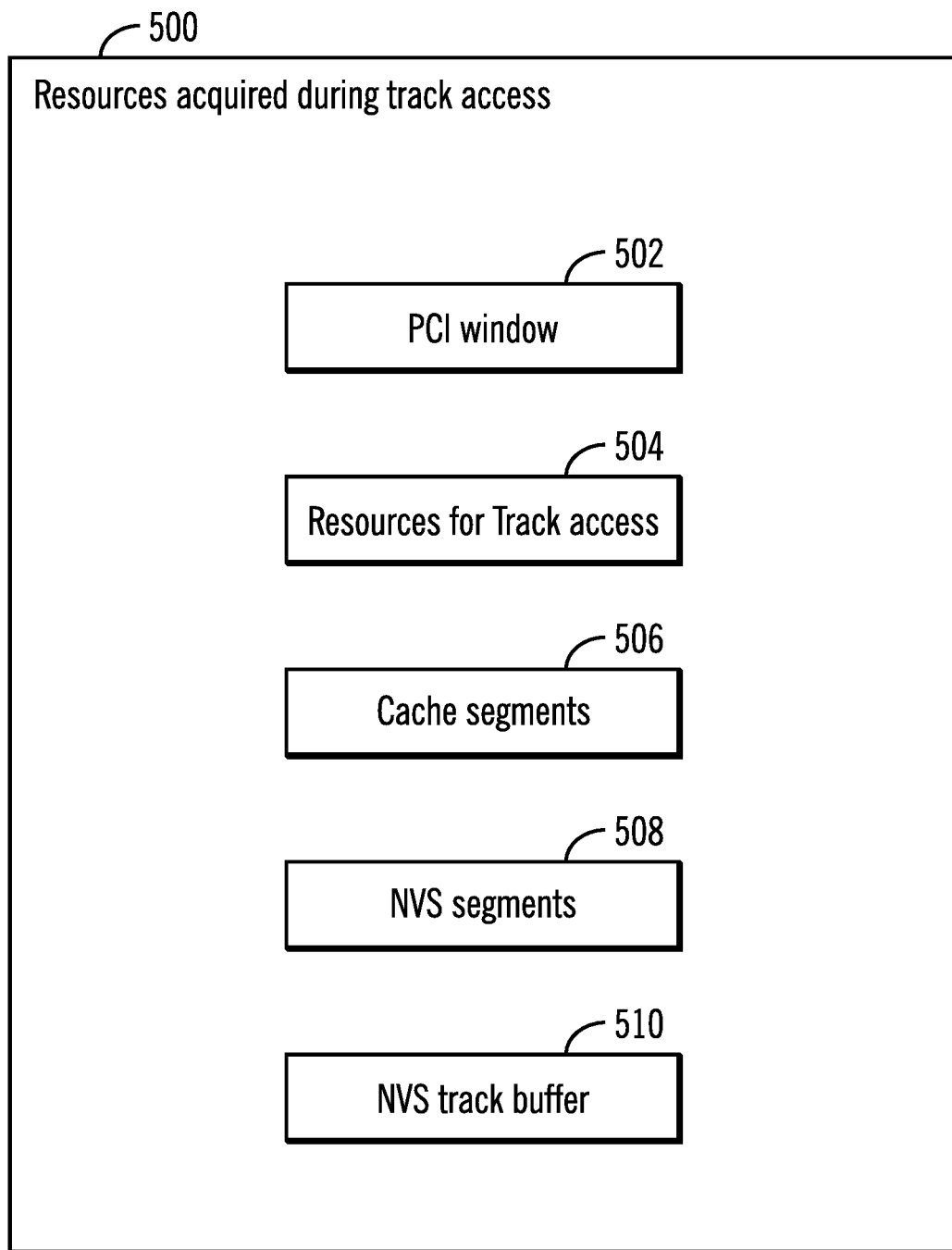
FIG. 5 illustrates a block diagram that shows exemplary resources acquired during track access during syncio processing, in accordance with certain embodiments.

FIG. 5 illustrates a block diagram 500 that shows exemplary resources acquired during track access during syncio processing, in accordance with certain embodiments. The exemplary resources may include a PCI window 502 when the bus interface 118, 120 is a PCI bus. The exemplary resources may also include resources for track access 504, cache segments 506, NVS segments 508, and NVS track buffers 510.

Figure 6:
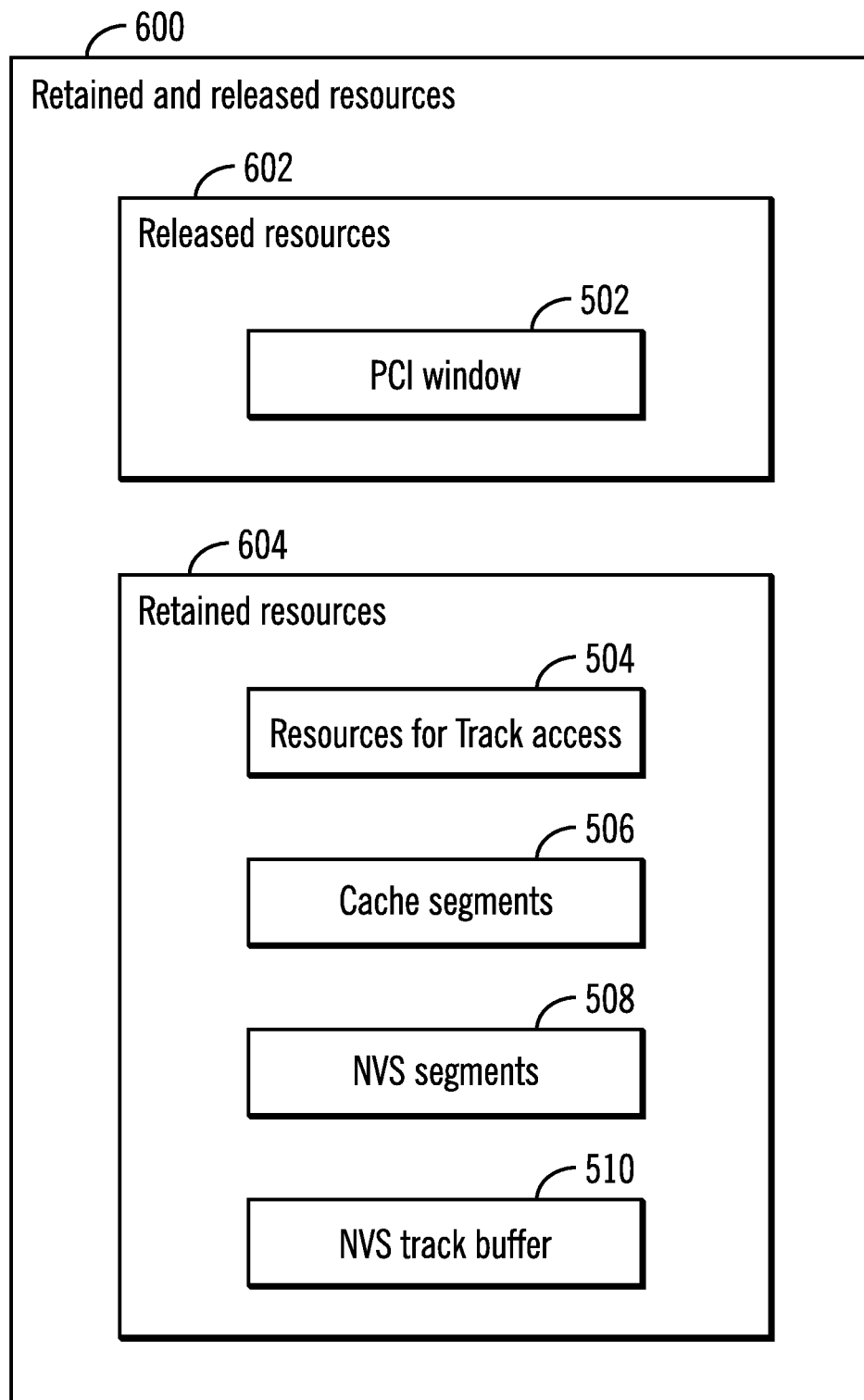
FIG. 6 illustrates a block diagram that shows exemplary resources released and retained for performing non-syncio processing when a syncio processing fails, in accordance with certain embodiments.

FIG. 6 illustrates a block diagram 600 that shows exemplary resources released and retained for performing non-syncio processing when a syncio processing fails, in accordance with certain embodiments. The embodiments shown in FIG. 6 may be performed when a token number that identifies a failed syncio write is resent at a time when the failed write is transmitted from the host 104 over a network interface to perform traditional I/O (i.e., non-syncio processing).

The released resources 602 after failing syncio may include the PCI window resource, as this resource is not needed for performing traditional I/O. The retained resources 604 for reuse may include resources for track access 504, cache segments 506, NVS segments 508, and NVS track buffers 510.

Figure 7:
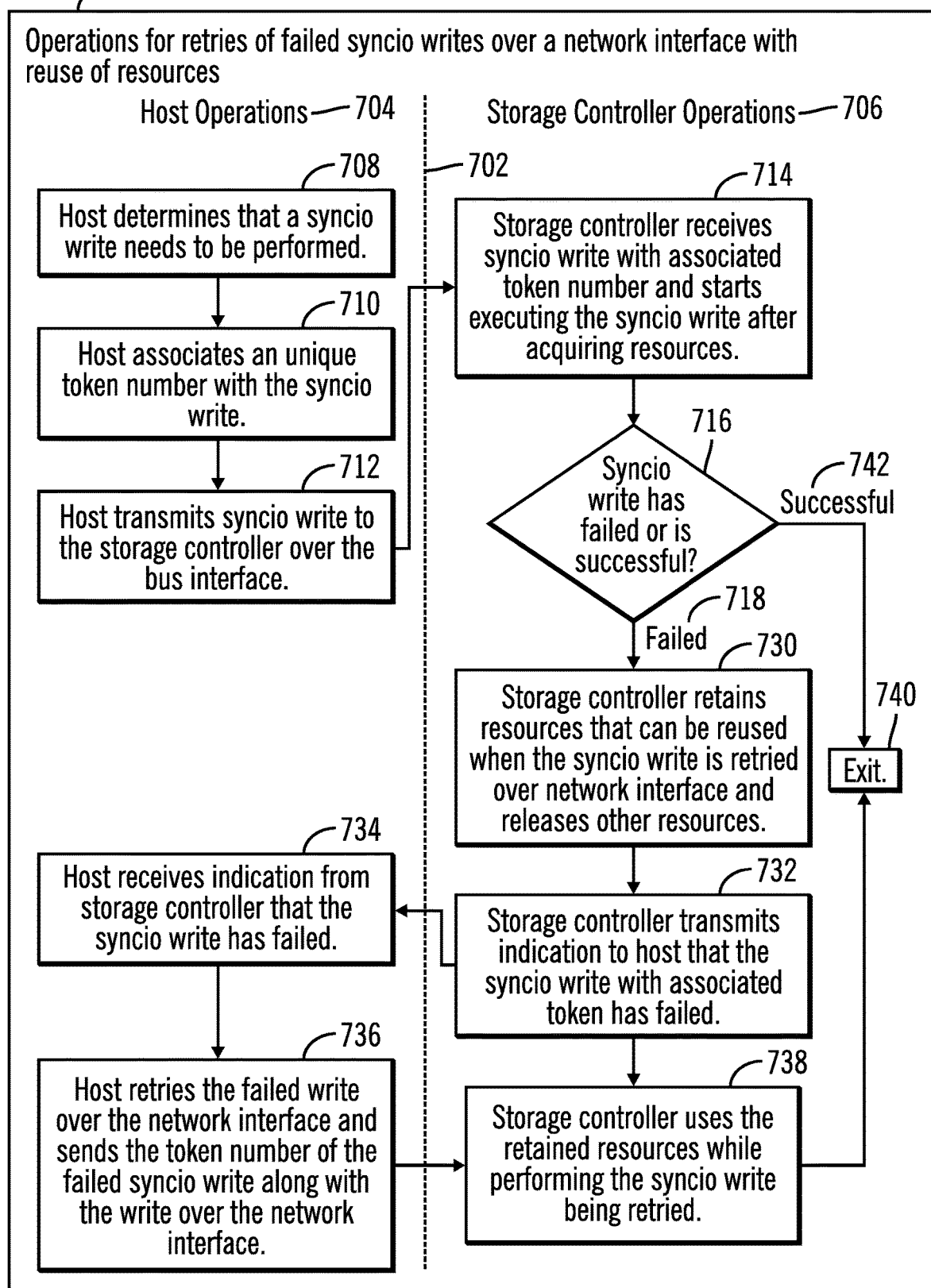
FIG. 7 illustrates a flowchart that shows operations for retries of failed syncio writes over a network interface with reuse of resources, in accordance with certain embodiments.

FIG. 7 illustrates a flowchart 700 that shows operations for retries of failed syncio writes over a network interface 122, 124 with reuse of resources, in accordance with certain embodiments. The operations shown to the left of the vertical dashed line 702 are operations performed by the host computational device (referred to as host operations 704). The operations shown to the right of the vertical dashed line 702 are operations performed by the storage controller 102 (referred to as storage controller operations 706).

Control starts at block 708 in which a host 104 determines that a syncio write needs to be performed, and then the host 104 associates (at block 710) a unique token number with the syncio write. The host 104 then transmits (at block 712) the syncio write to the storage controller 102 over the bus interface 118.

The storage controller 102 receives (at block 714) the syncio write with the associated token and starts executing the syncio write after acquiring resources to perform the syncio write, and then determines (at block 716) whether the syncio write has failed or is successful). If the syncio write has failed (branch 718) control proceeds to block 720 in which the storage controller 102 retains resources that can be reused when the syncio write is retried over a network interface and releases other resources. The storage controller 102 then transmits (at block 732) an indication to the host 104 that the syncio write has failed.

The host 104 receives (at block 734) the indication from the storage controller 102 that the syncio write has failed, and then the host 104 retries (at block 736) the failed write over the network interface 122 and sends the token number of the failed syncio write along with the write over the network interface.

Since in this embodiment, the storage controller 102 has not released at least some of the resources that were acquired for the syncio write, the storage controller 102 uses the retained resources and performs the write (at block 738). It should be noted that the token number received with the write over the network interface is used to determine the corresponding syncio write that failed, by determining the failed syncio write with the matching token number. Then the process exits (at block 740). Also, at block 716 if the syncio write is successful (branch 742), then the process exits (at block 740).

The operations performed in block 738 in which certain resources previously acquired for syncio are reused for the traditional I/O takes less time in comparison to the operations shown in block 326 of FIG. 3, in which certain resources previously acquired for syncio have to be reacquired. Since syncio writes in FIG. 7 are identified by a unique identification, the storage controller 102 is able to determine retained resources for reuse for the non-syncio write received from the host 104 (via host operations performed at block 736).

Figure 8:
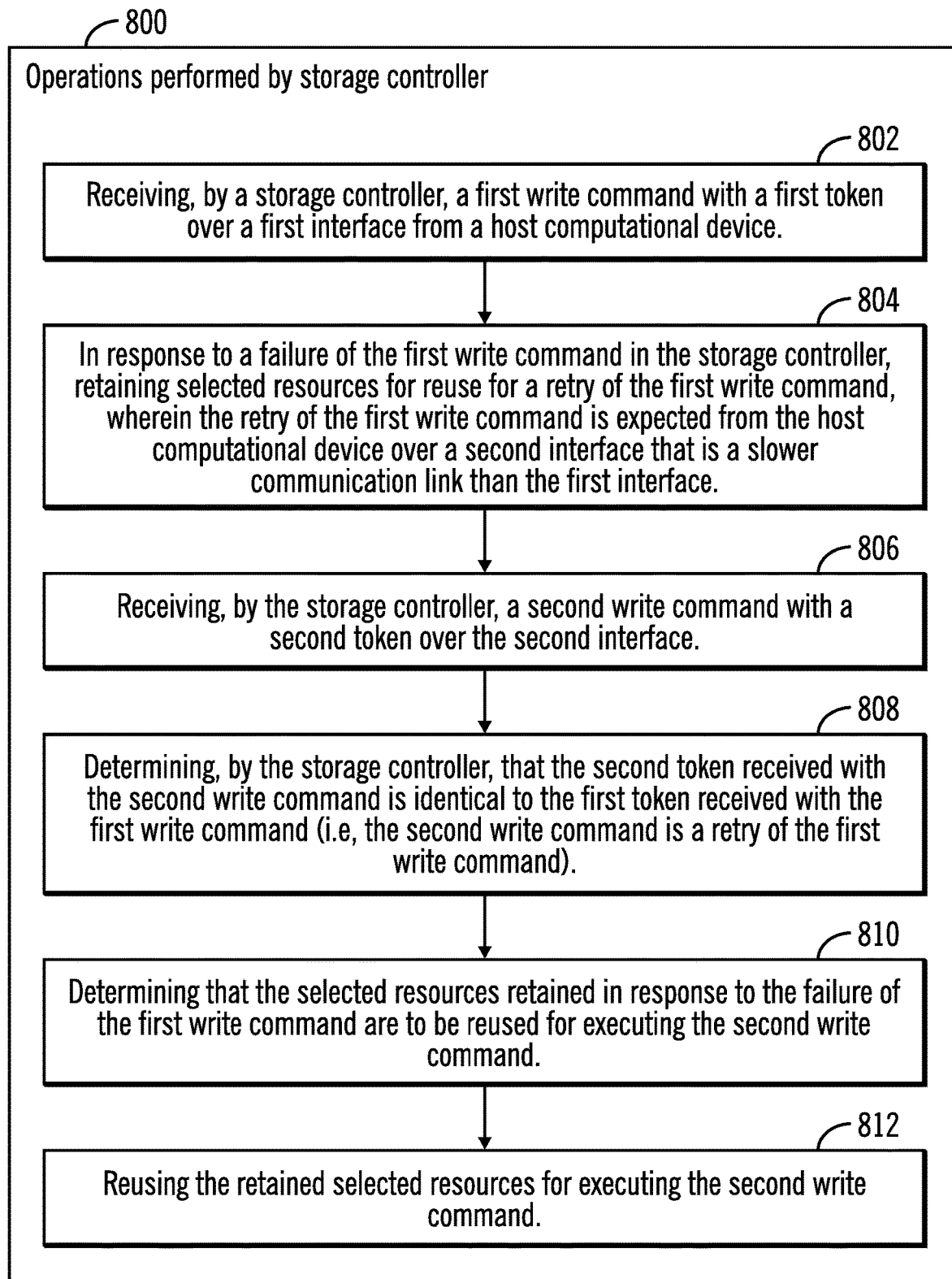
FIG. 8 illustrates a flowchart that shows operations performed by a storage controller, in accordance with certain embodiments.

FIG. 8 illustrates a flowchart 800 that shows operations performed by a storage controller 102, in accordance with certain embodiments.

Control starts at block 802 in which a storage controller 102 receives a first write command with a first token over a first interface (e.g., bus interface for syncio operations) from a host computational device 104. In response to a failure of the first write command in the storage controller 102, the storage controller 102 retains (at block 804) selected resources (e.g., resources 504, 506, 508, 510) for reuse for a retry of the first write command, wherein the retry of the first write command is expected from the host computational device 104 over a second interface (e.g., a network interface for traditional I/O) that is a slower communication link than the first interface.

The storage controller 102 receives (at block 806) a second write command with a second token over the second interface. The storage controller 102 determines (at block 808) that the second token received with the second write command is identical to the first token received with the first write command (i.e., the second write command is a retry of the first write command).

Control proceeds to block 810 in which the storage controller 102 determines that the selected resources retained in response to the failure of the first write command are to be reused for executing the second write command, and then reuses the retained selected resources for executing the second write command (at block 812).

Figure 9:
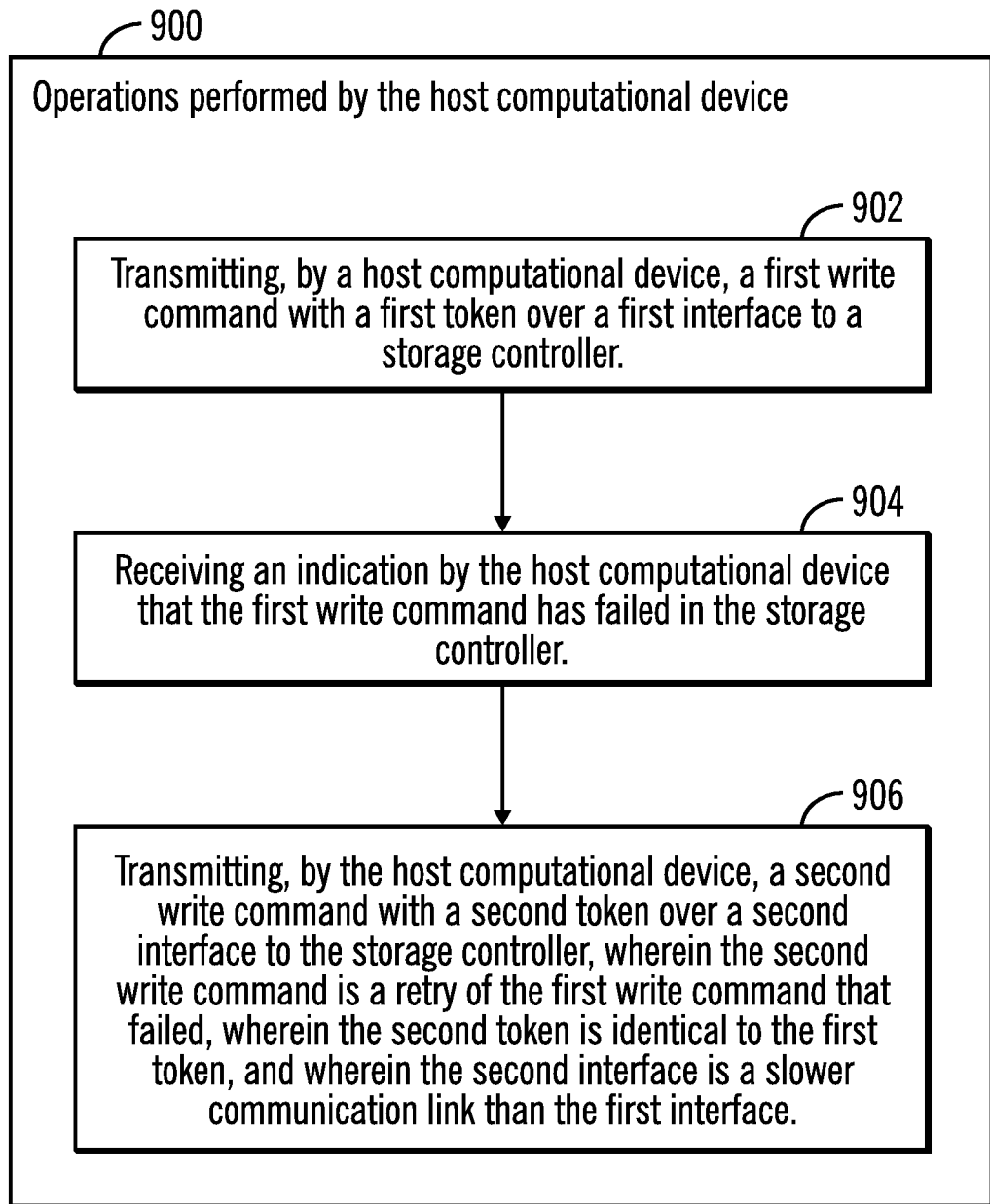
FIG. 9 illustrates a flowchart that shows operations performed by a host computational device, in accordance with certain embodiments.

FIG. 9 illustrates a flowchart that shows operations performed by a host computational device 104, in accordance with certain embodiments.

Control starts at block 902 in which a host computational device 104 transmits a first write command with a first token over a first interface (e.g., bus interface) to a storage controller 102. Control proceeds to block 904 in which the host computational device 104 receives an indication from the storage controller 102 that the first write command as failed in the storage controller 102.

From block 904 control proceeds to block 906 in which the host computational device transmits a second write command with a second token over a second interface (e.g., network interface) to the storage controller, wherein the second write command is a retry of the first write command that failed, wherein the second token is identical to the first token, and wherein the second interface is a slower communication link than the first interface. By sending tokens that provide identification of write commands to the storage controller 102, the host computational device 104 facilitates the reuse of previously acquired and retained resources for failed syncio operations that are transmitted over a non-syncio interface comprising a network interface.

In alternative embodiments, failure on one link is retried on another link where the links may be other types of links besides network and bus interfaces. Resource transfer may be done in a similar manner for protocols other than those described in the embodiments.

Therefore, FIGS. 1-9 illustrate certain embodiments in which resources are reused when syncio write failures are retried via non-syncio writes, by associating token numbers with writes, where the token numbers allow non-syncio writes to be matched to failed syncio writes.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 10:
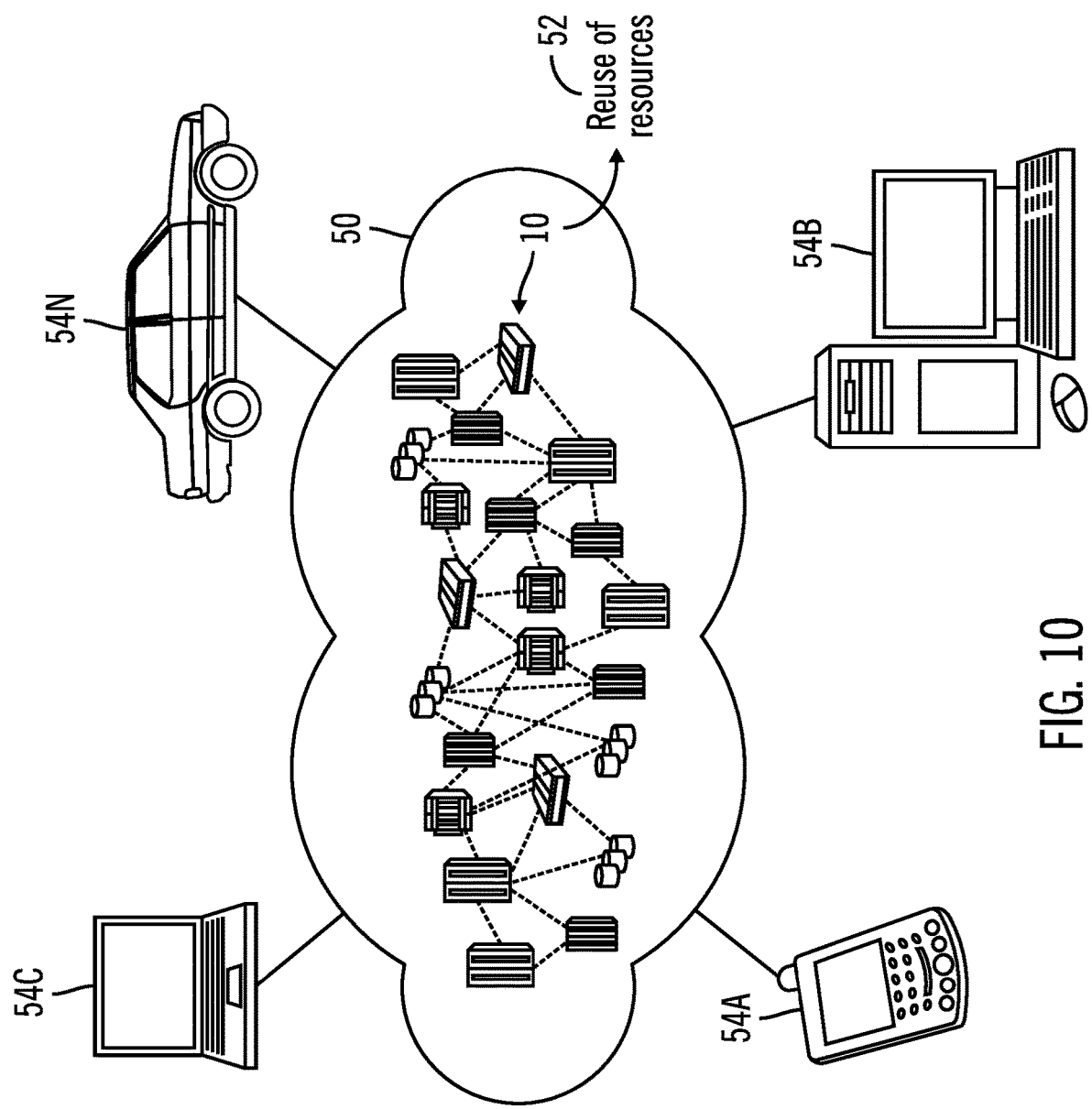
FIG. 10 illustrates a block diagram of a cloud computing environment, in accordance with certain embodiments.

Referring now to FIG. 10 an illustrative cloud computing environment 50 is depicted. Reuse of resources (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
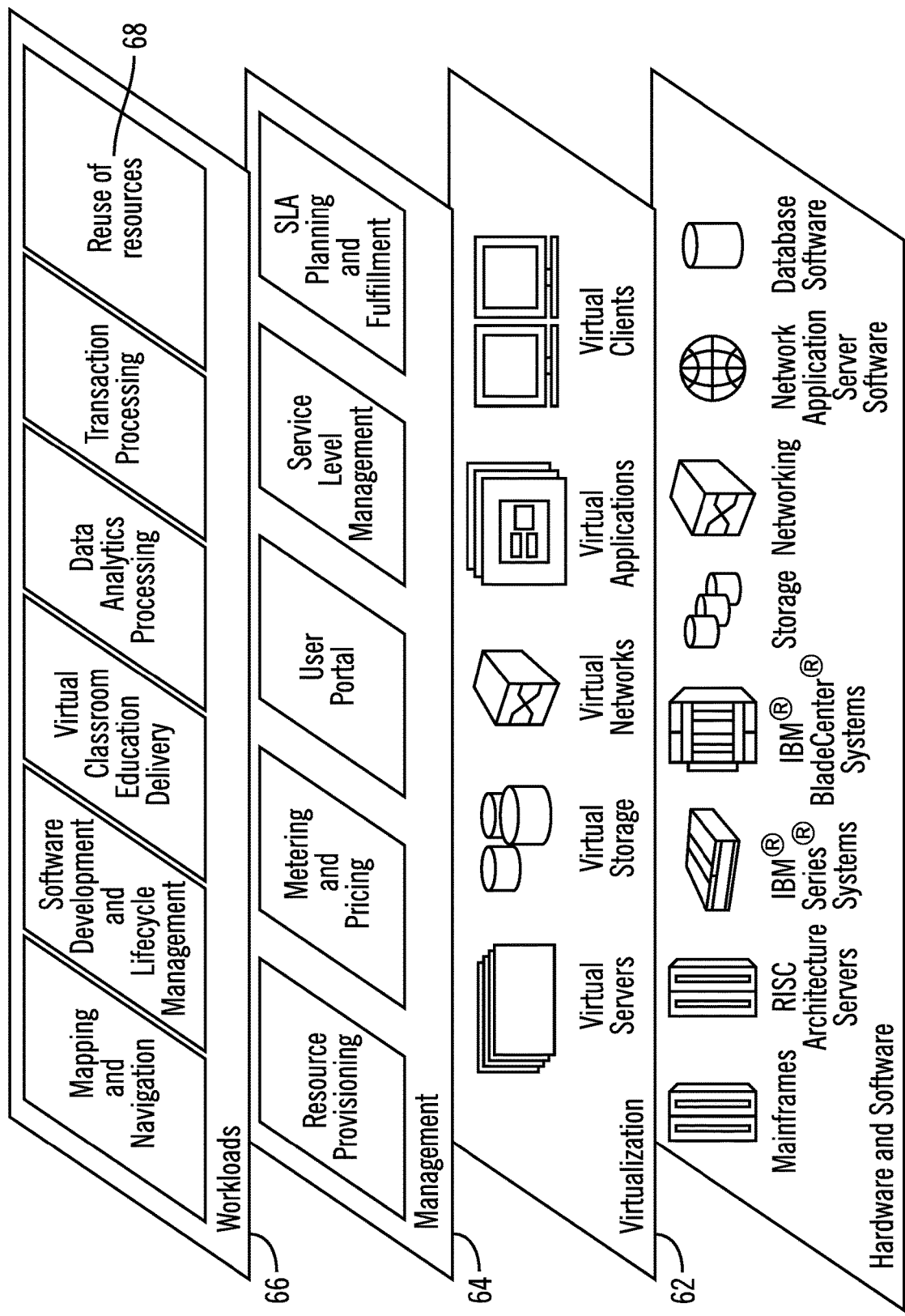
FIG. 11 illustrates a block diagram of further details of the cloud computing environment of FIG. 10, in accordance with certain embodiments.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEBSPHERE* application server software; and database software, in one example IBM DB2* database software.

*IBM, ZSERIES, PSERIES, XSERIES, BLADECENTER, WEBSPHERE, DB2 are trademarks or registered trademarks of International Business Machines Corporation registed in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and reuse of resources 68 as shown in FIGS. 1-11.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 12:
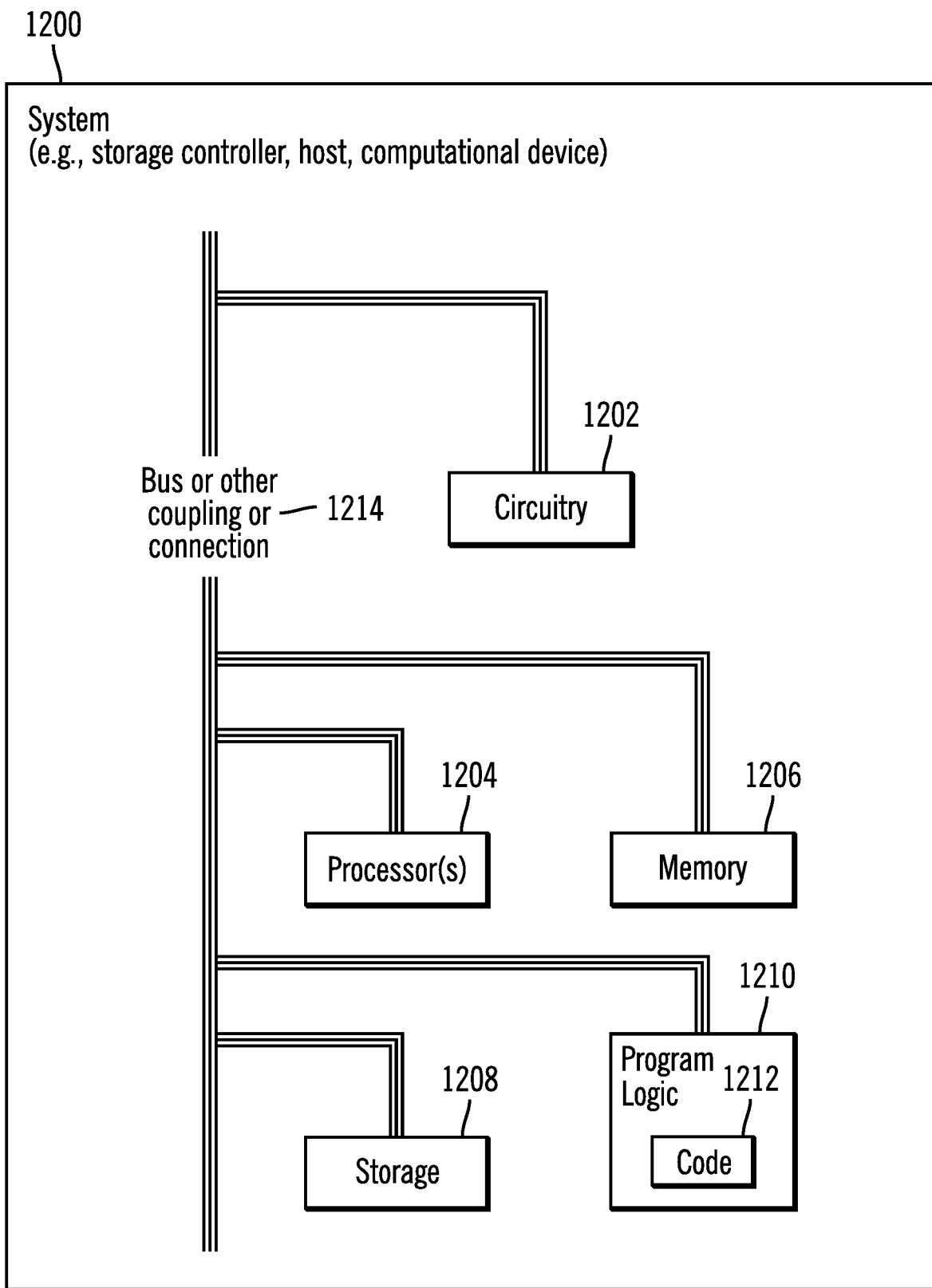
FIG. 12 illustrates a block diagram of a computational system that shows certain elements that may be included in the storage controller or the host, as described in FIGS. 1-11, in accordance with certain embodiments.

FIG. 12 illustrates a block diagram that shows certain elements that may be included in the storage controller 102, the hosts 104, 106, or computational devices, in accordance with certain embodiments. The system 1200 may include a circuitry 1202 that may in certain embodiments include at least a processor 1204. The system 1200 may also include a memory 1206 (e.g., a volatile memory device), and storage 1208. The storage 1208 may include a non-volatile memory device (e.g., EEPROM, ROM, PROM, flash, firmware, programmable logic, etc.), magnetic disk drive, optical disk drive, tape drive, etc. The storage 1208 may comprise an internal storage device, an attached storage device and/or a network accessible storage device. The system 1200 may include a program logic 1210 including code 1212 that may be loaded into the memory 1206 and executed by the processor 1204 or circuitry 1202. In certain embodiments, the program logic 1210 including code 1212 may be stored in the storage 1208. In certain other embodiments, the program logic 1210 may be implemented in the circuitry 1202. One or more of the components in the system 1200 may communicate via a bus or via other coupling or connection 1214. While FIG. 12 shows the program logic 1210 separately from the other elements, the program logic 1210 may be implemented in the memory 1206 and/or the circuitry 1202.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   receiving, by a storage controller, a first write command with a first token over a first interface from a host computational device;
   in response to a failure of the first write command in the storage controller, retaining selected resources for reuse for a retry of the first write command, wherein the retry of the first write command is expected from the host computational device over a second interface that is a slower communication link than the first interface; and
   in response to receiving, by the storage controller, a second write command with a second token over the second interface, wherein the second token is identical to the first token, determining that the second write command is a retry of the first write command and reusing the retained selected resources for executing the second write command.

2. The method of claim 1, the method further comprising:
   in response to determining, by the storage controller, that the second token received with the second write command is identical to the first token received with the first write command, determining that the selected resources retained in response to the failure of the first write command are to be reused for executing the second write command.

3. The method of claim 1, wherein:
   the first interface is a bus interface; and
   the second interface is a network interface.

4. The method of claim 3, wherein the first write command is executed over the bus interface via a synchronous input/output (I/O) process, wherein in the synchronous I/O process, the host computational device holds an application thread in a spin loop waiting for the first write command to complete.

5. The method of claim 3, wherein the second write command is executed over the network interface via a process in which the host computational device does not hold an application thread in a spin loop waiting for the second write command to complete.

6. The method of claim 3, wherein the first write command is executed over the bus interface via a process in which the host computational device holds an application thread in a spin loop waiting for the first write command to complete.

7. The method of claim 1, wherein the first write command is executed over the first interface via a process in which the host computational device holds an application thread in a spin loop waiting for the first write command to complete.

8. A system, comprising:
   a memory; and
   a processor coupled to the memory, wherein the processor performs operations, the operations comprising:
   receiving a first write command with a first token over a first interface from a host computational device;
   in response to a failure of the first write command, retaining selected resources for reuse for a retry of the first write command, wherein the retry of the first write command is expected from the host computational device over a second interface that is a slower communication link than the first interface; and
   in response to receiving a second write command with a second token over the second interface, wherein the second token is identical to the first token, determining that the second write command is a retry of the first write command and reusing the retained selected resources for executing the second write command.

9. The system of claim 8, the operations further comprising:
   in response to determining that the second token received with the second write command is identical to the first token received with the first write command, determining that the selected resources retained in response to the failure of the first write command are to be reused for executing the second write command.

10. The system of claim 8, wherein:
    the first interface is a bus interface; and
    the second interface is a network interface.

11. The system of claim 10, wherein the first write command is executed over the bus interface via a synchronous input/output (I/O) process, wherein in the synchronous I/O process, the host computational device holds an application thread in a spin loop waiting for the first write command to complete.

12. The system of claim 11, wherein the first write command is executed over the bus interface via a process in which the host computational device holds an application thread in a spin loop waiting for the first write command to complete.

13. The system of claim 10, wherein the second write command is executed over the network interface via a process in which the host computational device does not hold an application thread in a spin loop waiting for the second write command to complete.

14. The system of claim 8, wherein the first write command is executed over the first interface via a process in which the host computational device holds an application thread in a spin loop waiting for the first write command to complete.

15. A computer program product, the computer program product comprising a computer readable storage medium having computer readable program code embodied therewith, the computer readable program code configured to perform operations, the operations comprising:

receiving, by a storage controller, a first write command with a first token over a first interface from a host computational device;

in response to a failure of the first write command in the storage controller, retaining selected resources for reuse for a retry of the first write command, wherein the retry of the first write command is expected from the host computational device over a second interface that is a slower communication link than the first interface; and in response to receiving, by the storage controller, a second write command with a second token over the second interface, wherein the second token is identical to the first token, determining that the second write command is a retry of the first write command and reusing the retained selected resources for executing the second write command.

16. The computer program product of claim 15, the operations further comprising:

in response to determining, by the storage controller, that the second token received with the second write command is identical to the first token received with the first write command, determining that the selected resources retained in response to the failure of the first write command are to be reused for executing the second write command.

17. The computer program product of claim 15, wherein:
the first interface is a bus interface; and
the second interface is a network interface.

18. The computer program product of claim 17, wherein the first write command is executed over the bus interface via a synchronous input/output (I/O) process, wherein in the synchronous I/0 process, the host computational device holds an application thread in a spin loop waiting for the first write command to complete.

19. The computer program product of claim 18, wherein the first write command is executed over the bus interface via a process in which the host computational device holds an application thread in a spin loop waiting for the first write command to complete.

20. The computer program product of claim 15, wherein the first write command is executed over the first interface via a process in which the host computational device holds an application thread in a spin loop waiting for the first write command to complete.

* * * * *